United States Patent
Huang

(10) Patent No.: US 11,737,022 B2
(45) Date of Patent: Aug. 22, 2023

(54) DELAY ADJUSTMENT METHOD AND DEVICE, ELECTRONIC DEVICE AND STORAGE MEDIUM

(71) Applicant: BEIJING XIAOMI PINECONE ELECTRONICS CO., LTD., Beijing (CN)

(72) Inventor: Zhuliang Huang, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 108 days.

(21) Appl. No.: 17/330,227

(22) Filed: May 25, 2021

(65) Prior Publication Data

US 2022/0116871 A1   Apr. 14, 2022

(30) Foreign Application Priority Data

Oct. 9, 2020   (CN) .......................... 202011075446.2

(51) Int. Cl.
*G06F 1/14* (2006.01)
*G06F 1/32* (2019.01)
*H04W 52/02* (2009.01)
*G06F 1/3209* (2019.01)

(52) U.S. Cl.
CPC .......... *H04W 52/0219* (2013.01); *G06F 1/14* (2013.01); *G06F 1/3209* (2013.01); *H04W 52/0222* (2013.01)

(58) Field of Classification Search
None
See application file for complete search history.

(56) References Cited

U.S. PATENT DOCUMENTS

| | | | |
|---|---|---|---|
| 10,679,629 | B2 | 6/2020 | Pasko |
| 2018/0108351 | A1 | 4/2018 | Beckhardt et al. |
| 2019/0074008 | A1 | 3/2019 | Beckhardt et al. |
| 2019/0311720 | A1 | 10/2019 | Pasko |
| 2019/0372902 | A1 | 12/2019 | Piersol |
| 2020/0234708 | A1 | 7/2020 | Beckhardt et al. |
| 2020/0301661 | A1 | 9/2020 | Pasko |
| 2021/0029048 | A1 | 1/2021 | Piersol |
| 2021/0084589 | A1* | 3/2021 | Yu ..................... H04W 52/0229 |

FOREIGN PATENT DOCUMENTS

CN       110073326 A      7/2019

OTHER PUBLICATIONS

Extended European Search Report in the European Application No. 21176269.5, dated Nov. 19, 2021, (7p).

* cited by examiner

*Primary Examiner* — Fahmida Rahman
(74) *Attorney, Agent, or Firm* — Arch & Lake LLP

(57) ABSTRACT

A delay adjustment method is applied to a first electronic device, and the first electronic device is any device in a distributed device network. The method includes: a starting delay of a wakeup engine of at least one second electronic device in the network is acquired; it is determined whether a starting delay of a wakeup engine of the first electronic device needs to be adjusted according to the starting delay of the wakeup engine of the first electronic device and the starting delay of the wakeup engine of the at least one second electronic device; and responsive to that the starting delay of the first electronic device needs to be adjusted, the starting delay of the wakeup engine is adjusted, and wakeup information interaction is performed with the at least one second electronic device based on the adjusted starting delay of the wakeup engine.

12 Claims, 5 Drawing Sheets

DELAY ADJUSTMENT METHOD AND DEVICE, ELECTRONIC DEVICE AND STORAGE MEDIUM

CROSS-REFERENCE TO RELATED APPLICATIONS

This application is filed based upon and claims the priority of Chinese patent application No. 202011075446.2, filed on Oct. 9, 2020, the entire content of which is incorporated herein by reference for all purposes.

TECHNICAL FIELD

The present disclosure generally relates to the technical field of communications, and more particularly, to a delay adjustment method and device, an electronic device and a storage medium.

BACKGROUND

At present, there are many types of electronic devices on the market, and the performance of the devices may be greatly different due to factors such as the technology and the cost.

Responsive to that electronic devices participate in a network/networking, the performance of each electronic device involved in the network is greatly different, and consequently, there may be delays for interactions between the electronic devices, resulting in poor interaction consistency.

SUMMARY

According to a first aspect of the present disclosure, a delay adjustment method is provided, which may be applied to a first electronic device, the first electronic device being any device in a distributed device network, and may include: acquiring a starting delay of a wakeup engine of at least one second electronic device in the distributed device network; determining whether to adjust a starting delay of a wakeup engine of the first electronic device according to the starting delay of the wakeup engine of the first electronic device and the starting delay of the wakeup engine of the at least one second electronic device; and adjusting, in response to determining that the starting delay of the first electronic device needs to be adjusted, the starting delay of the wakeup engine, and performing wakeup information interaction with the at least one second electronic device based on adjusted starting delay of the wakeup engine.

According to a second aspect of the present disclosure, a delay adjustment device is provided, which may include: a processor; and a memory configured to store instructions executable by the processor. The processor may be configured to: acquire a starting delay of a wakeup engine of at least one second electronic device in the distributed device network; determine whether to adjust a starting delay of a wakeup engine of the first electronic device according to the starting delay of the wakeup engine of the first electronic device and the starting delay of the wakeup engine of the at least one second electronic device; and adjust, in response to determining that the starting delay of the first electronic device needs to be adjusted, the starting delay of the wakeup engine and perform wakeup information interaction with the at least one second electronic device based on adjusted starting delay of the wakeup engine.

According to a third aspect of the present disclosure, anon-transitory computer-readable storage medium is provided, instructions in the storage medium may be executed by a processor of a terminal to cause the terminal to execute the delay adjustment method, the method comprising: acquiring a starting delay of a wakeup engine of at least one second electronic device in the distributed device network; determining whether to adjust a starting delay of a wakeup engine of the first electronic device according to the starting delay of the wakeup engine of the first electronic device and the starting delay of the wakeup engine of the at least one second electronic device; and adjusting, in response to determining that the starting delay of the first electronic device needs to be adjusted, the starting delay of the wakeup engine, and performing wakeup information interaction with the at least one second electronic device based on adjusted starting delay of the wakeup engine.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Figure 1:
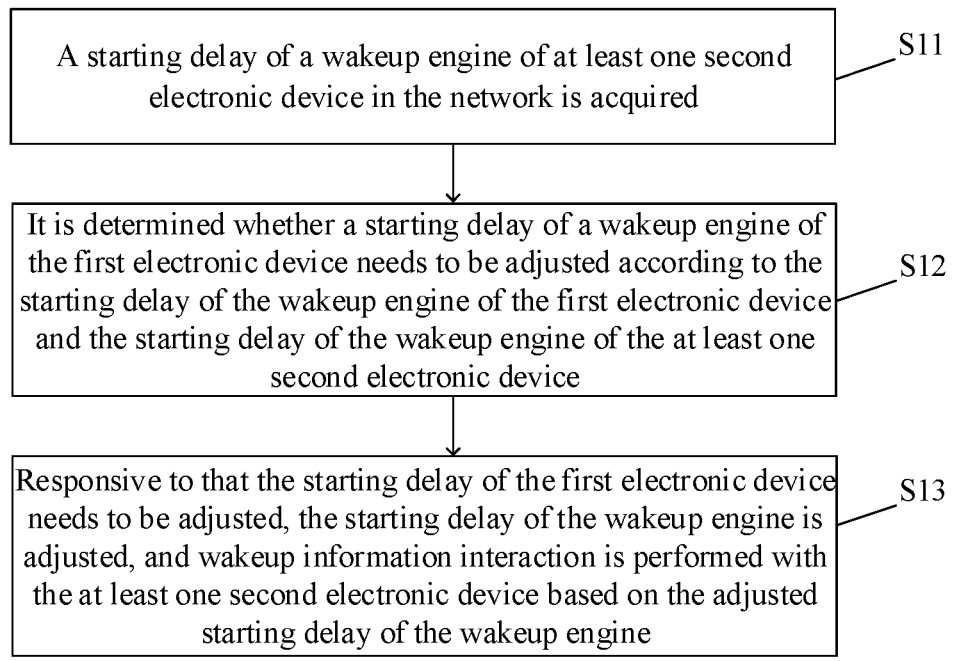
FIG. 1 is a flow chart showing a delay adjustment method, according to an example of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 is a flow chart showing a delay adjustment method, according to an example of the present disclosure. As illustrated in FIG. 1, the delay adjustment method (or called the device delay adjustment method) is applied to a first electronic device, the first electronic device being any device in a distributed device network, and includes the following operations.

At S11, a starting delay of a wakeup engine of at least one second electronic device in the network is acquired.

At S12, it is determined whether a starting delay of a wakeup engine of the first electronic device needs to be adjusted according to the starting delay of the wakeup engine of the first electronic device and the starting delay of the wakeup engine of the at least one second electronic device.

At S13, responsive to that the starting delay of the first electronic device needs to be adjusted, the starting delay of the wakeup engine is adjusted, and wakeup information interaction is performed with the at least one second electronic device based on the adjusted starting delay of the wakeup engine.

In the example of the present disclosure, the first electronic device and the second electronic device may be an intelligent speaker, a sweeping robot and wearable electronic devices such as intelligent glasses and the like. No limits are made in the example of the present disclosure. Both the first electronic device and the second electronic device are devices in the network.

In an example of the present disclosure, when the first electronic device and the second electronic device log in a server based on predetermined accounts, the server matches the accounts and divides the first electronic device and second electronic device belonging to the same account into a group to form the network. The server may push a device identifier of each electronic device in the network to each electronic device in the network such that each electronic device learns about information of the other electronic devices in the network.

In another example of the present disclosure, each electronic device belonging to the same local area network account may also discover one another by sending a multicast, thereby creating a group to form the network.

It is to be noted that, in the example of the present disclosure, the electronic device may obtain and locally store the device identifier and starting delay of the wakeup engine of each electronic device in the network in a networking process. When the starting delay of the wakeup engine of any electronic device in the network is updated, the other electronic devices may also receive the updated starting delay of the electronic device.

At S11, the first electronic device may acquire the starting delay of the wakeup engine of the at least one second electronic device in the network. The starting delay of the wakeup engine refers to a time difference from reception of an instruction by the electronic device to responding to the instruction.

In an example of the present disclosure, when the starting delay of the wakeup engine of the at least one second electronic device is acquired, the starting delay, which needs to be obtained, of the wakeup engine of the second electronic device is determined according to interaction between each second electronic device and the first electronic device. For example, only the starting delay of the wakeup engine of the second electronic device of which an interaction rate with the first electronic device is higher than a preset interaction rate threshold is acquired. Since additional power consumption is needed when the device delay is adjusted, in such a manner, the necessity of device delay adjustment may be improved, and the power consumption may be reduced.

In another example of the present disclosure, when the starting delay of the wakeup engine of the at least one second electronic device is acquired, the starting delays of the wakeup engines of all the second electronic devices may be acquired by default. In the example, the starting delays of the wakeup engines of all the second electronic devices in the network are acquired to determine adjustment of the delay of the first electronic device, such that adjustment of the starting delay of the first electronic device may be adapted to interaction with all the second electronic devices in the network to achieve higher adjustment precision.

At S12, the first electronic device may determine whether the starting delay of the wakeup engine of the first electronic device needs to be adjusted according to the starting delay of its own wakeup engine and the starting delay of the wakeup engine of the at least one second electronic device.

In the example of the present disclosure, when the first electronic device determines whether the starting delay of the wakeup engine of the first electronic device needs to be adjusted according to the starting delay of its own wakeup engine and the starting delay of the wakeup engine of the at least one second electronic device, for example, a delay difference between the starting delay of the wakeup engine of the first electronic device and the starting delay of the at least one second electronic device is compared with a preset threshold to determine whether the starting delay of the wakeup engine of the first electronic device needs to be adjusted.

At S13, the first electronic device, in response to determining that its own starting delay needs to be adjusted, adjusts its own starting delay and performs wakeup information interaction with the at least one second electronic device based on the adjusted starting delay of the wakeup engine.

It is to be noted that, in the example of the present disclosure, when the first electronic device determines that its own starting delay does not need to be adjusted, the original starting delay of the wakeup engine is kept unchanged. In addition, in the example of the present disclosure, any device in the network may be the first electronic device, and it is determined whether the starting delay of the wakeup engine of the first electronic device needs to be adjusted based on the starting delay of the wakeup engine of the second electronic device except the first electronic device in the network.

In an example, a fixed time compensation value (starting delay) may be set for an electronic device when the electronic device is delivered (or a software version is upgraded) such that a fixed time compensation is adopted every time when the electronic device interacts during networking. Even though a network environment changes, the fixed time compensation is still adopted.

Figure 2:
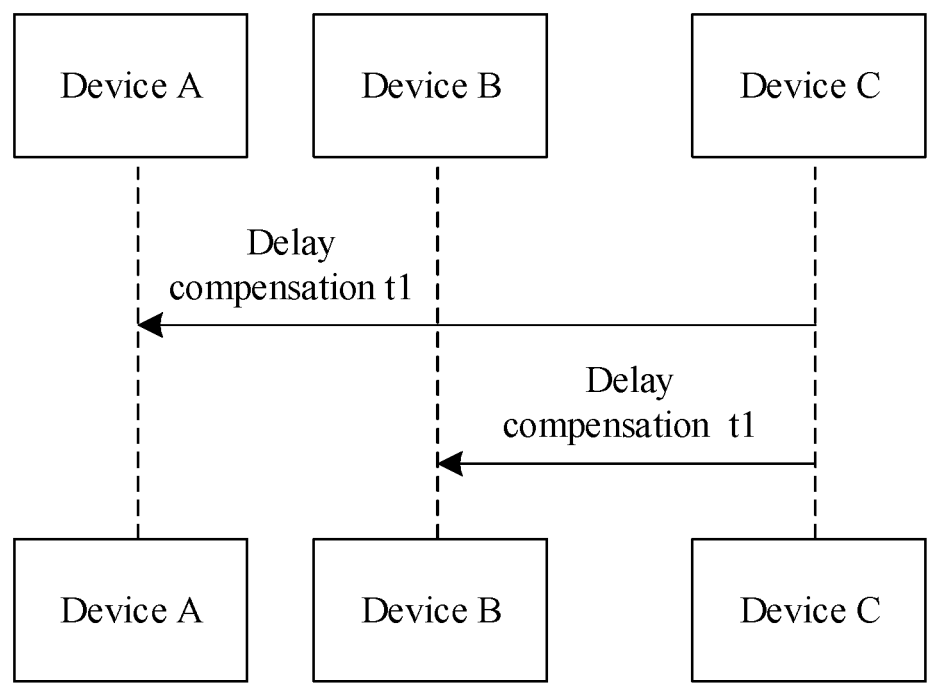
FIG. 2 is an example diagram of a fixed device delay.

FIG. 2 is an example diagram of a fixed device delay. As illustrated in FIG. 2, when a fixed delay compensation of a device C is t1 and the device C needs to interact with a device A and device B in a network, the fixed delay compensation t1 may be adopted for interaction with the device A or device B in the network every time.

It can be understood that, in this manner, the fixed value is adopted every time regardless of the network environment, and consequently, there is such a problem that the starting delay setting reliability is not so high and cannot meet requirements of different scenarios. In addition, the manner of setting the starting delay when the device is delivered or software is upgraded may require independent setting for each device, and thus is high in workload and limited in extensibility and applicability.

Comparatively, in the present disclosure, the first electronic device acquires the starting delay of the wakeup engine of the at least one second electronic device in the network, determines whether its own starting delay needs to be adjusted according to the starting delay of the first electronic device and, after determining that adjustment is needed, performs adjustment. It is determined whether adjustment is needed with reference to the starting delay of the second electronic device in the network, namely with reference to a network environment.

On one hand, unnecessary adjustment is reduced, and the power consumption is reduced. On the other hand, adaptive adjustment may be implemented according to the network environment, then an obtained device delay is relatively precise, and the delay adjustment reliability is high. In addition, the delay of the first electronic device is dynamically adjusted according to the network environment and does not need to be fixed in the device, such that the extensibility is higher.

For example, both the first electronic device and the second electronic device are intelligent speakers. After multiple intelligent speakers in the network receive a voice wakeup event, different intelligent speakers may send wakeup data packets to one another, and the specific speaker responding to the wakeup event is determined according to the device closest to a user. For example, for a speaker A and a speaker B, the speaker B, if determining that the speaker B responds to the wakeup event, replies to the speaker A, and the speaker A, if also determining that the speaker B responds to the wakeup event, does not reply to the speaker B. If the speaker A does not receive any wakeup data packet in delay time, the speaker A and the speaker B may be woken up at the same time, thereby bringing bad experiences to the user. Therefore, in the present disclosure, in the manner of obtaining a reliable delay according to the network environment, the simultaneous wakeup rate of the devices may be reduced, and the user experiences are improved.

In an example, the operation that the starting delay of the wakeup engine of the at least one second electronic device in the network is acquired includes: when a device identifier, stored in the first electronic device, of any second electronic device in the network is kept unchanged in a preset time length, a starting delay of a wakeup engine of each second electronic device in a present network is acquired; and the operation that it is determined whether the starting delay of the wakeup engine of the first electronic device needs to be adjusted according to the starting delay of the wakeup engine of the first electronic device and the starting delay of the wakeup engine of the at least one second electronic device includes: it is determined whether the starting delay of the wakeup engine of the first electronic device needs to be adjusted according to the starting delay of the wakeup engine of the first electronic device and the starting delay of the wakeup engine of each second electronic device in the network.

As described above, the electronic device may obtain and locally store the device identifier and starting delay of the wakeup engine of each electronic device in the network in the networking process. In the example of the present disclosure, when the device identifier, stored in the first electronic device, of any second electronic device in the network is kept unchanged in the preset time length, the starting delay of the wakeup engine of each second electronic device in the present network is acquired.

It is to be noted that, when the device identifier of any second electronic device in the network is kept unchanged in the preset time length, it indicates that the network has been stable. After the network is stable, it is determined whether adjustment is needed. The starting delays of the wakeup engines of all the devices in the network are collected, and then it is determined whether the delay needs to be adjusted. In such a manner, the effectiveness of determining whether adjustment is needed may be improved. In addition, in the present disclosure, the starting delay of the wakeup engine of each second electronic device in the network is acquired, and it is determined whether the starting delay of the wakeup engine of the first electronic device needs to be adjusted in combination with the starting delay of the wakeup engine of the first electronic device, such that the accuracy of adjusting the delay of the first electronic device may be improved.

In an example, the operation that the starting delay of the wakeup engine of the at least one second electronic device in the network is acquired includes: when a device identifier of the second electronic device in the network is updated, the acquired starting delay of the wakeup engine of the at least one second electronic device in the network is updated; and the operation that it is determined whether the starting delay of the wakeup engine of the first electronic device needs to be adjusted according to the starting delay of the wakeup engine of the first electronic device and the starting delay of the wakeup engine of the at least one second electronic device includes: it is determined whether the starting delay of the wakeup engine of the first electronic device needs to be adjusted according to the starting delay of the wakeup engine of the first electronic device and the updated starting delay of the wakeup engine of the at least one second electronic device.

In the example of the present disclosure, when a device in the network where the first electronic device is located is updated, namely the device identifier of the second electronic device in the network is updated, the first electronic device needs to update the acquired starting delay of the wakeup engine of the at least one second electronic device in the network and determine whether the starting delay of the first electronic device needs to be adjusted based on the updated starting delay of the at least one second electronic device.

It can be understood that, in the present disclosure, the starting delay of the second electronic device may be updated to dynamically adjust the starting delay of the first electronic device, and when a new second electronic device joins the network or a second electronic device withdraws from the network, adaptive adjustment may also be implemented based on the present updated network environment and the devices do not need to be modified one by one in a software upgrading manner, such that high flexibility is achieved.

In an example, the operation that it is determined whether the starting delay of the wakeup engine of the first electronic device needs to be adjusted according to the starting delay of the wakeup engine of the first electronic device and the starting delay of the wakeup engine of the at least one second electronic device includes: the starting delay of the wakeup engine of the first electronic device is compared with the starting delay of the wakeup engine of the at least one second electronic device to determine a maximum delay of the wakeup engines of the devices in the network; and it is determined whether the starting delay of the wakeup engine of the first electronic device needs to be adjusted based on the maximum delay and a preset maximum delay tolerance value.

In the example of the present disclosure, when it is determined whether the starting delay of the wakeup engine of the first electronic device needs to be adjusted according to the starting delay of the wakeup engine of the first electronic device and the starting delay of the wakeup engine of the at least one second electronic device, the starting delay of the wakeup engine of the first electronic device is compared with the starting delay of the wakeup engine of the at least one second electronic device at first to determine a maximum delay of the wakeup engines of the devices in the network, and it is determined whether the starting delay of the wakeup engine of the first electronic device needs to be adjusted based on the maximum delay and the preset maximum delay tolerance value. The preset maximum delay tolerance value refers to an allowed delay for sending of a data packet between the devices.

It can be understood that, in the process, the maximum delay of the network is obtained based on the starting delays of all the electronic devices in the network, such that the performance of all the electronic devices in the network is considered. For the present first electronic device in the network, it is determined whether the starting delay of the first electronic device needs to be adjusted based on the starting delay of the first electronic device, the maximum delay and the preset maximum delay tolerance value, namely with reference to the performance of the first electronic device and the performance of each electronic device in the network environment. In such a manner, the starting delay of the first electronic device may be determined in combination with the network environment, such that high accuracy is achieved.

As described above, any device in the network may be the first electronic device, and thus each device in the network may determine whether to be delayed to wait for another device in the network according to a calculated result. In such a manner, a device with high performance and a short front-end delay may wait for a device with low performance and a long front-end delay to achieve a purpose of automatically adjusting the consistency.

In an example, the operation that it is determined whether the starting delay of the wakeup engine of the first electronic device needs to be adjusted based on the maximum delay and the preset maximum delay tolerance value includes: when a delay difference between the maximum delay and the starting delay of the wakeup engine of the first electronic device is greater than the preset maximum delay tolerance value, it is determined that the starting delay of the wakeup engine of the first electronic device needs to be adjusted; and the operation that the starting delay of the wakeup engine is adjusted responsive to that the starting delay of the first electronic device needs to be adjusted includes: responsive to that the starting delay of the first electronic device needs to be adjusted, the starting delay of the wakeup engine of the first electronic device is adjusted at least by a difference value between the delay difference and the preset maximum delay tolerance value.

In the example of the present disclosure, the maximum delay represents the delay of the electronic device with lowest performance in the network, such that the electronic device with highest performance needs to wait for an electronic device with low performance. When the delay difference between the maximum delay and the starting delay of the wakeup engine of the first electronic device is greater than the preset maximum delay tolerance value, it indicates that the starting delay of the first electronic device is short, and the starting delay of the first electronic device needs to be adjusted.

Specifically, during adjustment, the starting delay of the wakeup engine of the first electronic device may be adjusted into the difference value between the delay difference and the preset maximum delay tolerance value.

Exemplarily, there are three electronic devices in the network, i.e., a first electronic device A, a second electronic device B and a second electronic device C. If a starting delay of a wakeup engine of the first electronic device A is 10 milliseconds (ms), a starting delay of a wakeup engine of the second electronic device B is 100 ms, a starting delay of a wakeup engine of the second electronic device C is 150 ms and the preset maximum delay tolerance value is 100 ms, a delay difference between the starting delay of the first electronic device A and the maximum delay 150 ms is 140 ms, and the delay difference is greater than the preset maximum delay tolerance value 100 ms, such that the delay of the first electronic device needs to be adjusted at least by 40 ms (140 ms-100 ms) to ensure that a delay difference between the first electronic device A and the second electronic device C with lowest performance is in a range of the preset maximum delay tolerance value.

It is to be noted that, in the example of the present disclosure, when the delay difference between the maximum delay and the starting delay of the wakeup engine of the first electronic device is less than or equal to the preset maximum delay tolerance value, it indicates that the delay difference between the starting delay of the first electronic device and the delay of the electronic device with the lowest performance is in an allowable delay range, such that the starting delay of the first electronic device may be kept unchanged and does not need to be adjusted.

In an example, before the operation that it is determined whether the starting delay of the wakeup engine of the first electronic device needs to be adjusted based on the maximum delay and the preset maximum delay tolerance value, the method further includes: an online dotting log of at least one of the first electronic device or the at least one second electronic device is acquired; network transmission time for transmission of a wakeup data packet after the associated wakeup engine is started in the online dotting log is statistically obtained; and the preset maximum delay tolerance value is determined based on a preset decision-making timeout and the network transmission time. The decision-making timeout is preset time required from reception of a wakeup event by the wakeup engine of at least one of the first electronic device or the at least one second electronic device to decision-making about whether to respond to the wakeup event.

In the example of the present disclosure, the preset maximum delay tolerance value may be obtained by statistically analyzing historical data. The first electronic device may record its own online dotting log during work and may also obtain the online dotting log of the at least one second electronic device and statistically obtain the network transmission time for transmission of the wakeup data packet after the associated wakeup engine is started in the online dotting log. The network transmission time may be an average value of associated network transmission time for transmission of wakeup data packets in the online dotting lot, and is, for example, t1.

It is to be noted that the preset decision-making timeout of the present disclosure is the time required from reception of the wakeup event by the wakeup engine of at least one of the first electronic device or the at least one second electronic device to decision-making about whether to respond to the wakeup event. For example, if the first electronic device and the second electronic device are intelligent speakers, the first electronic device and the second electronic device, after receiving the wakeup event, may send wakeup data packets to each other to determine the specific intelligent speaker for responding, and the decision-making timeout includes time when the wakeup data packet is sent and time when a decision is made. In an example of the present disclosure, the preset decision-making timeout may be time preset according to a user experience condition, for example, t2.

In the present disclosure, the preset maximum delay tolerance value may be determined based on the preset decision-making timeout and the network transmission time. For example, a half of a difference value between the preset decision-making timeout and the network transmission time may be determined as the preset maximum delay tolerance value, namely (t2−t1)/2.

Figure 3:
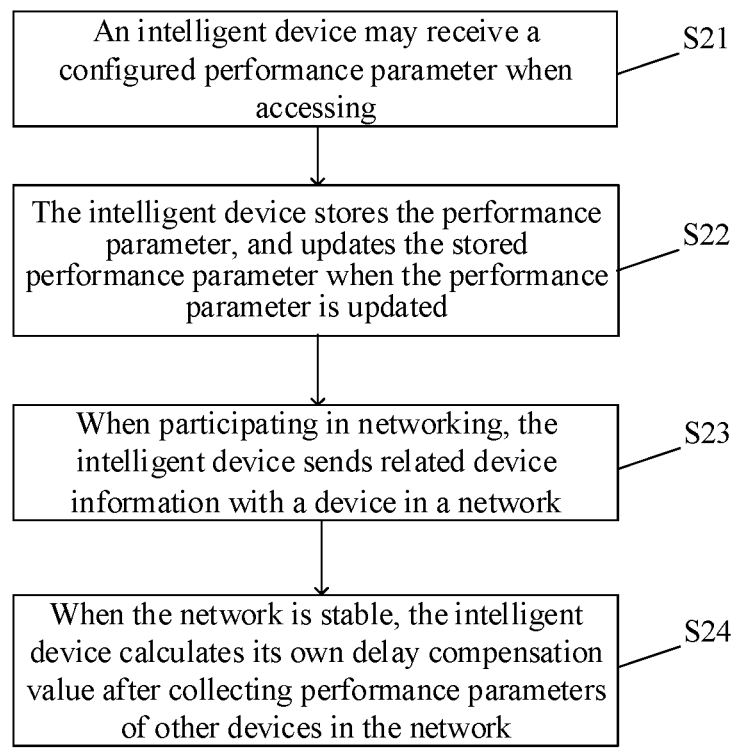
FIG. 3 is a flow chart showing a delay adjustment method, according to an example of the present disclosure.

FIG. 3 is a flow chart showing a delay adjustment method, according to an example of the present disclosure. As illustrated in FIG. 3, the method includes the following operations.

At S21, an intelligent device may receive a configured performance parameter when accessing.

In the example, access of the intelligent device may refer to access of the intelligent device to a network, that is, the intelligent device may access the network. During access, a technician may test the performance of the intelligent device, thereby setting the performance parameter of the intelligent device. The performance parameter at least includes a starting delay of a wakeup engine.

At S22, the intelligent device stores the performance parameter, and updates the stored performance parameter when the performance parameter is updated.

In the example, every time when started, the intelligent device may acquire its own performance parameter and detect whether the performance parameter changes, and if YES, updates the stored performance parameter.

At S23, when participating in networking, the intelligent device sends related device information with a device in a network.

In the example, the intelligent device, when participating in networking, may send the related device information including the performance parameter with the device in the network, namely acquiring a starting delay of a wakeup engine of at least one second electronic device in the network. For example, each device sends its own performance parameter to another device, and the device stores a performance parameter of each other device in the network.

At S24, when the network is stable, the intelligent device calculates its own delay compensation value after collecting performance parameters of other devices in the network.

For example, a relative maximum delay of the wakeup engines of the devices in the network is max_delay_time, an acceptable maximum relative delay is accept_delay_time (fixed value), and a relative delay of the device is self_delay_time. In such case, a) when a difference value between max_delay_time and self_delay_time is less than or equal to accept_delay_time (that is, (max_delay_time-self_delay_time) ⇐accept_delay_ time), the device does not need to be delayed; and b) when a difference value between max_delay_time and self_delay_time is greater than accept_delay_time ((max_delay_time-self_delay_time)>accept_delay_time), a wakeup data packet of the device is sent after a delay, and the delay refers to that the difference value between max_delay_time and self_delay_time minus accept_delay_time ((max_delay_time-self_delay_time)−accept_delay_time).

Herein, max_delay_time is the maximum delay of the wakeup engines of the devices in the network, accept_delay_time is the preset maximum delay tolerance value, and self_delay_time is the starting delay of the wakeup engine of the first electronic device.

In a), that is, when the delay difference between the maximum delay and the starting delay of the wakeup engine of the first electronic device is less than or equal to the preset maximum delay tolerance value, the starting delay of the first electronic device is kept unchanged.

In b), that is, when the delay difference between the maximum delay and the starting delay of the wakeup engine of the first electronic device is greater than the preset maximum delay tolerance value, it is determined that the starting delay of the wakeup engine of the first electronic device needs to be adjusted, and the starting delay of the wakeup engine of the first electronic device is adjusted at least by the difference value between the delay difference and the preset maximum delay tolerance value.

It can be understood that, in the example, it is determined whether adjustment is needed with reference to the starting delay of each electronic device in the network, namely with reference to the network environment. On one hand, unnecessary adjustment is reduced, and the power consumption is reduced. On the other hand, adaptive adjustment may be implemented according to the network environment, then an obtained device delay is relatively precise, and the delay adjustment reliability is high. In addition, the delay of the first electronic device is dynamically adjusted according to the network environment and does not need to be fixed in the device, such that the extensibility is higher.

Figure 4:
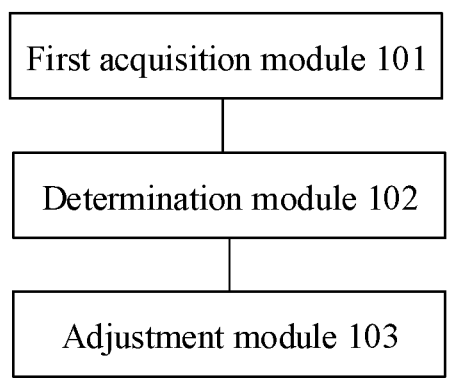
FIG. 4 is a diagram of a delay adjustment device, according to an exemplary example.

FIG. 4 is a diagram of a delay adjustment device, according to an example. Referring to FIG. 4, the delay adjustment device is applied to a first electronic device. The first electronic device is any device in a distributed device network. The device includes: a first acquisition module 101, a determination module 102 and an adjustment module 103.

The first acquisition module 101 is configured to acquire a starting delay of a wakeup engine of at least one second electronic device in the network.

The determination module 102 is configured to determine whether a starting delay of a wakeup engine of the first electronic device needs to be adjusted according to the starting delay of the wakeup engine of the first electronic device and the starting delay of the wakeup engine of the at least one second electronic device.

The adjustment module 103 is configured to, responsive to that the starting delay of the first electronic device needs to be adjusted, adjust the starting delay of the wakeup engine and perform wakeup information interaction with the at least one second electronic device based on the adjusted starting delay of the wakeup engine.

In some examples, the first acquisition module 101 is specifically configured to, when a device identifier, stored in the first electronic device, of any second electronic device in the network is kept unchanged in a preset time length, acquire a starting delay of a wakeup engine of each second electronic device in a present network; and the determination module 102 is specifically configured to determine whether the starting delay of the wakeup engine of the first electronic device needs to be adjusted according to the starting delay of the wakeup engine of the first electronic device and the starting delay of the wakeup engine of each second electronic device in the network.

In some examples, the first acquisition module 101 is specifically configured to, when a device identifier of the second electronic device in the network is updated, update the acquired starting delay of the wakeup engine of the at least one second electronic device in the network; and the determination module 102 is specifically configured to determine whether the starting delay of the wakeup engine of the first electronic device needs to be adjusted according to the starting delay of the wakeup engine of the first electronic device and the updated starting delay of the wakeup engine of the at least one second electronic device.

In some examples, the determination module 102 is specifically configured to compare the starting delay of the wakeup engine of the first electronic device with the starting delay of the wakeup engine of the at least one second electronic device to determine a maximum delay of the wakeup engines of the devices in the network, and determine whether the starting delay of the wakeup engine of the first electronic device needs to be adjusted based on the maximum delay and a preset maximum delay tolerance value.

In some examples, the determination module 102 is specifically configured to, when a delay difference between the maximum delay and the starting delay of the wakeup engine of the first electronic device is greater than the preset maximum delay tolerance value, determine that the starting delay of the wakeup engine of the first electronic device needs to be adjusted; and the adjustment module 103 is specifically configured to, responsive to that the starting delay of the first electronic device needs to be adjusted, adjust the starting delay of the wakeup engine of the first electronic device at least by a difference value between the delay difference and the preset maximum delay tolerance value.

In some examples, before the determination module determines whether the starting delay of the wakeup engine of the first electronic device needs to be adjusted based on the maximum delay and the preset maximum delay tolerance value, the device further includes: a second acquisition module 104, a statistical module 105 and a second determination module 106.

The second acquisition module 104 is configured to acquire an online dotting log of at least one of the first electronic device or the at least one second electronic device.

The statistical module 105 is configured to statistically obtain network transmission time for transmission of a wakeup data packet after the associated wakeup engine is started in the online dotting log.

The second determination module 106 is configured to determine the preset maximum delay tolerance value based on a preset decision-making timeout and the network transmission time, and the decision-making timeout is preset time required from reception of a wakeup event by the wakeup engine of at least one of the first electronic device or the at least one second electronic device to decision-making about whether to respond to the wakeup event.

With respect to the device in the above examples, the specific manner for the operation executed by each module has been described in detail in the examples related to the method, and is not repeated herein.

Figure 5:
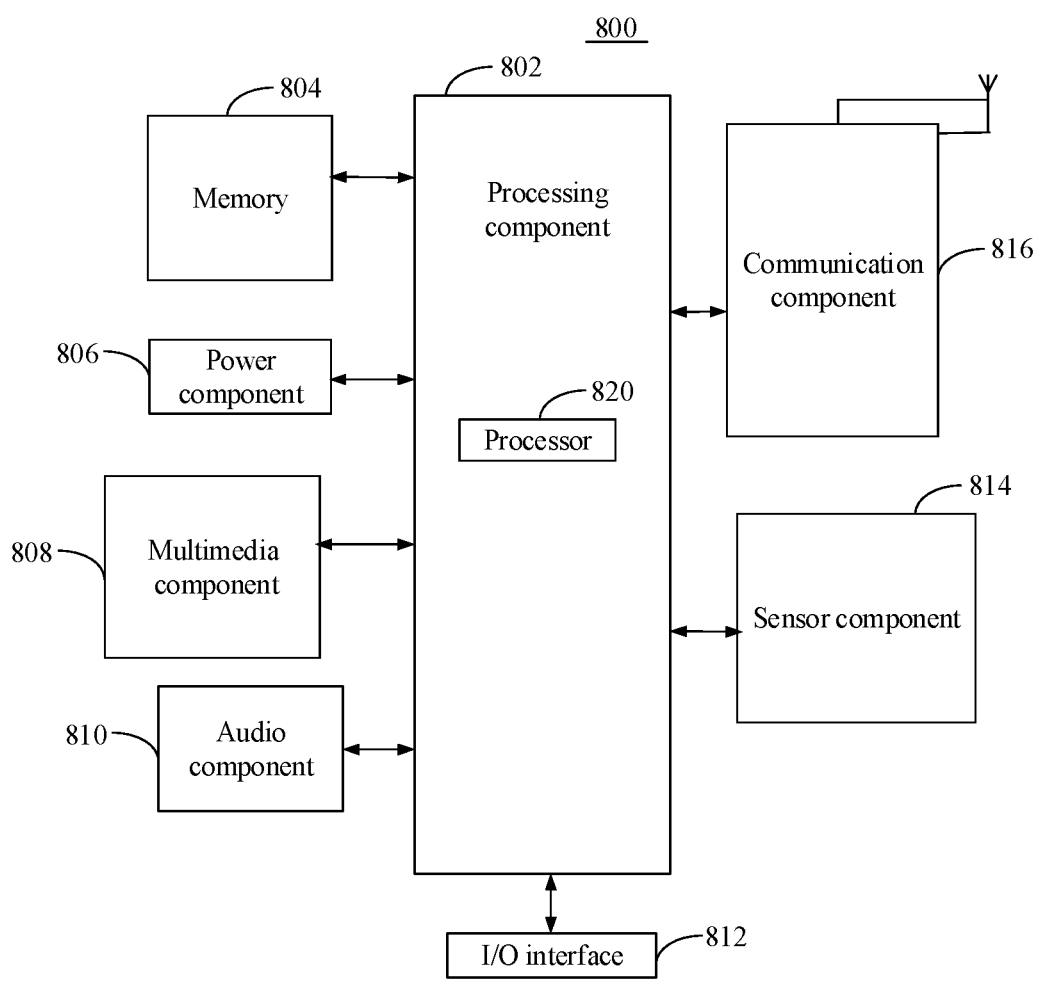
FIG. 5 is a block diagram of an electronic device, according to an example of the present disclosure.

FIG. 5 is a block diagram of an electronic device 800, according to an example. For example, the device 800 may be an intelligent speaker.

Referring to FIG. 5, the device 800 may include one or more of the following components: a processing component 802, a memory 804, a power component 806, a multimedia component 808, an audio component 810, an input/output (I/O) interface 812, a sensor component 814, or a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the abovementioned method. Moreover, the processing component 802 may include one or more modules which facilitate interaction between the processing component 802 and other components. For instance, the processing component 802 may include a multimedia module to facilitate interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 806 provides power for various components of the device 800. The power component 806 may include a power management system, one or more power supplies, and other components associated with generation, management and distribution of power for the device 800.

The multimedia component 808 includes a screen providing an output interface between the device 800 and a user. In some examples, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some examples, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a microphone (MIC), and the MIC is configured to receive an external audio signal when the device 800 is in an operation mode, such as a call mode, a recording mode and a voice recognition mode. The received audio signal may further be stored in the memory 804 or sent through the communication component 816. In some examples, the audio component 810 further includes a speaker configured to output the audio signal.

The I/O interface 812 provides an interface between the processing component 802 and peripheral interface modules, such as a keyboard, a click wheel, buttons and the like. The buttons may include, but are not limited to: a home button, a volume button, a starting button and a locking button.

The sensor component 814 includes one or more sensors configured to provide status assessments in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a complementary metal oxide semiconductor (CMOS) or charge coupled device (CCD) image sensor, configured for use in an imaging application. In some examples, the sensor component 814 may also include an acceleration sensor, a gyroscope sensor, a magnetic sensor, a pressure sensor or a temperature sensor.

The communication component 816 is configured to facilitate wired or wireless communication between the device 800 and other devices. The device 800 may access a communication-standard-based wireless network, such as a wireless fidelity (WiFi) network, a 2nd-generation (2G) or 3rd-generation (3G) network or a combination thereof. In an example, the communication component 816 receives a broadcast signal or broadcast associated information from an external broadcast management system through a broadcast channel. In an example, the communication component 816 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In an example, the device 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned methods.

In an example, there is also provided anon-transitory computer-readable storage medium including instructions, such as included in the memory 804, executable by the processor 820 of the device 800 for performing the abovementioned methods. For example, the non-transitory computer-readable storage medium may be a ROM, a random access memory (RAM), a compact disc read-only memory (CD-ROM), a magnetic tape, a floppy disc, an optical data storage device, and the like.

A non-transitory computer-readable storage medium is provided. When instructions in the storage medium are executed by a processor of an electronic device, the electronic device may execute a delay adjustment method. The method is applied to a first electronic device, the first electronic device being any device in a distributed device network, the method may include: a starting delay of a wakeup engine of at least one second electronic device in the network is acquired; it is determined whether a starting delay of a wakeup engine of the first electronic device needs to be adjusted according to the starting delay of the wakeup engine of the first electronic device and the starting delay of the wakeup engine of the at least one second electronic device; and responsive to that the starting delay of the first electronic device needs to be adjusted, the starting delay of the wakeup engine is adjusted, and wakeup information interaction is performed with the at least one second electronic device based on the adjusted starting delay of the wakeup engine.

Other examples of the present disclosure will be apparent to those skilled in the art from consideration of the specification and practice of the present disclosure disclosed here. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A delay adjustment method, performed by a first electronic device in a distributed device network, and comprising:
acquiring a starting delay of a wakeup engine of at least one second electronic device in the distributed device network;
determining whether to adjust a starting delay of a wakeup engine of the first electronic device according to the starting delay of the wakeup engine of the first electronic device and the starting delay of the wakeup engine of the at least one second electronic device; and
adjusting, in response to determining that the starting delay of the wakeup engine of the first electronic device to be adjusted, the starting delay of the wakeup engine of the first electronic device, and performing wakeup information interaction with the at least one second electronic device via sending wakeup data packet from the first electronic device to the at least one second electronic device based on adjusted starting delay of the wakeup engine of the first electronic device, wherein determining whether to adjust the starting delay of the wakeup engine of the first electronic device according to the starting delay of the wakeup engine of the first electronic device and the starting delay of the wakeup engine of the at least one second electronic device comprises:

comparing the starting delay of the wakeup engine of the first electronic device with the starting delay of the wakeup engine of the at least one second electronic device to determine a maximum delay of the wakeup engines of devices in the distributed device network; and determining whether to adjust the starting delay of the wakeup engine of the first electronic device based on the maximum delay and a preset maximum delay tolerance value, wherein determining whether to adjust the starting delay of the wakeup engine of the first electronic device based on the maximum delay and the preset maximum delay tolerance value comprises:

determining that a delay difference between the maximum delay and the starting delay of the wakeup engine of the first electronic device is greater than the preset maximum delay tolerance value, and determining that the starting delay of the wakeup engine of the first electronic device to be adjusted; and wherein adjusting the starting delay of the wakeup engine of the first electronic device in response to determining the starting delay of the wakeup engine of the first electronic device to be adjusted comprises:

adjusting the starting delay of the wakeup engine of the first electronic device at least by a difference value between the delay difference and the preset maximum delay tolerance value.

2. The method of claim 1, wherein acquiring the starting delay of the wakeup engine of the at least one second electronic device in the distributed device network comprises:

in response to determining that a device identifier of each second electronic device in the distributed device network stored in the first electronic device is kept unchanged in a preset time length, acquiring a starting delay of a wakeup engine of each second electronic device in a present network; and wherein determining whether to adjust the starting delay of the wakeup engine of the first electronic device according to the starting delay of the wakeup engine of the first electronic device and the starting delay of the wakeup engine of the at least one second electronic device comprises:

determining whether to adjust the starting delay of the wakeup engine of the first electronic device according to the starting delay of the wakeup engine of the first electronic device and the starting delay of the wakeup engine of each second electronic device in the distributed device network.

3. The method of claim 1, wherein acquiring the starting delay of the wakeup engine of the at least one second electronic device in the distributed device network comprises:

updating, in response to determining that a device identifier of the second electronic device in the distributed device network is updated, acquired starting delay of the wakeup engine of the at least one second electronic device in the distributed device network; and wherein determining whether to adjust the starting delay of the wakeup engine of the first electronic device according to the starting delay of the wakeup engine of the first electronic device and the starting delay of the wakeup engine of the at least one second electronic device comprises:

determining whether to adjust the starting delay of the wakeup engine of the first electronic device according to the starting delay of the wakeup engine of the first electronic device and updated starting delay of the wakeup engine of the at least one second electronic device.

4. The method of claim 1, further comprising:

acquiring an online dotting log of at least one of the first electronic device or the at least one second electronic device;

obtaining network transmission time for transmission of a wakeup data packet after associated wakeup engine is started in the online dotting log; and determining the preset maximum delay tolerance value based on a preset decision-making timeout and the network transmission time, wherein the decision-making timeout is preset time required from reception of a wakeup event by the wakeup engine of at least one of the first electronic device or the at least one second electronic device to decision-making about whether to respond to the wakeup event.

5. A delay adjustment device, applied to a first electronic device in a distributed device network, and comprising:

a processor; and a memory for storing instructions executable by the processor;

wherein the processor is configured to:

acquire a starting delay of a wakeup engine of at least one second electronic device in the distributed device network;

determine whether to adjust a starting delay of a wakeup engine of the first electronic device according to the starting delay of the wakeup engine of the first electronic device and the starting delay of the wakeup engine of the at least one second electronic device; and adjust, in response to determining that the starting delay of the wakeup engine of the first electronic device to be adjusted, the starting delay of the wakeup engine of the first electronic device, and perform wakeup information interaction with the at least one second electronic device via sending wakeup data packet from the first electronic device to the at least one second electronic device based on adjusted starting delay of the wakeup engine of the first electronic device, wherein the processor is configured to:

compare the starting delay of the wakeup engine of the first electronic device with the starting delay of the wakeup engine of the at least one second electronic device to determine a maximum delay of the wakeup engines of devices in the distributed device network; and determine whether to adjust the starting delay of the wakeup engine of the first electronic device based on the maximum delay and a preset maximum delay tolerance value, wherein the processor is configured to:
  determine that a delay difference between the maximum delay and the starting delay of the wakeup engine of the first electronic device is greater than the preset maximum delay tolerance value, and determine that the starting delay of the wakeup engine of the first electronic device to be adjusted; and
  adjust the starting delay of the wakeup engine of the first electronic device at least by a difference value between the delay difference and the preset maximum delay tolerance value.

6. The device of claim 5, wherein the processor is configured to:
  in response to determining that a device identifier of each second electronic device in the distributed device network stored in the first electronic device is kept unchanged in a preset time length, acquire a starting delay of a wakeup engine of each second electronic device in a present network; and
  determine whether to adjust the starting delay of the wakeup engine of the first electronic device according to the starting delay of the wakeup engine of the first electronic device and the starting delay of the wakeup engine of each second electronic device in the distributed device network.

7. The device of claim 5, wherein the processor is configured to:
  in response to determining that a device identifier of the second electronic device in the distributed device network is updated, update acquired starting delay of the wakeup engine of the at least one second electronic device in the distributed device network; and
  determine whether to adjust the starting delay of the wakeup engine of the first electronic device according to the starting delay of the wakeup engine of the first electronic device and updated starting delay of the wakeup engine of the at least one second electronic device.

8. The device of claim 5, wherein the processor is further configured to:
  acquire an online dotting log of at least one of the first electronic device or the at least one second electronic device;
  obtain network transmission time for transmission of a wakeup data packet after associated wakeup engine is started in the online dotting log; and
  determine the preset maximum delay tolerance value based on a preset decision-making timeout and the network transmission time, wherein the decision-making timeout is preset time required from reception of a wakeup event by the wakeup engine of at least one of the first electronic device or the at least one second electronic device to decision-making about whether to respond to the wakeup event.

9. A non-transitory computer-readable storage medium, wherein instructions in the storage medium are executed by a processor of an electronic device to cause the electronic device to execute the delay adjustment method, the method is performed by a first electronic device in a distributed device network, and comprises:

acquiring a starting delay of a wakeup engine of at least one second electronic device in the distributed device network;
determining whether to adjust a starting delay of a wakeup engine of the first electronic device according to the starting delay of the wakeup engine of the first electronic device and the starting delay of the wakeup engine of the at least one second electronic device; and
adjusting, in response to determining that the starting delay of the wakeup engine of the first electronic device to be adjusted, the starting delay of the wakeup engine of the first electronic device, and performing wakeup information interaction with the at least one second electronic device via sending wakeup data packet from the first electronic device to the at least one second electronic device based on adjusted starting delay of the wakeup engine of the first electronic device, wherein determining whether to adjust the starting delay of the wakeup engine of the first electronic device according to the starting delay of the wakeup engine of the first electronic device and the starting delay of the wakeup engine of the at least one second electronic device comprises:
  comparing the starting delay of the wakeup engine of the first electronic device with the starting delay of the wakeup engine of the at least one second electronic device to determine a maximum delay of the wakeup engines of devices in the distributed device network; and
  determining whether to adjust the starting delay of the wakeup engine of the first electronic device based on the maximum delay and a preset maximum delay tolerance value, wherein determining whether to adjust the starting delay of the wakeup engine of the first electronic device based on the maximum delay and the preset maximum delay tolerance value comprises:
  determining that a delay difference between the maximum delay and the starting delay of the wakeup engine of the first electronic device is greater than the preset maximum delay tolerance value, and determining that the starting delay of the wakeup engine of the first electronic device to be adjusted; and wherein adjusting the starting delay of the wakeup engine of the first electronic device in response to determining the starting delay of the wakeup engine of the first electronic device to be adjusted comprises:
  adjusting the starting delay of the wakeup engine of the first electronic device at least by a difference value between the delay difference and the preset maximum delay tolerance value.

10. The non-transitory computer-readable storage medium of claim 9, wherein acquiring the starting delay of the wakeup engine of the at least one second electronic device in the distributed device network comprises:
  in response to determining that a device identifier of each second electronic device in the distributed device network stored in the first electronic device is kept unchanged in a preset time length, acquiring a starting delay of a wakeup engine of each second electronic device in a present network; and
  wherein determining whether to adjust the starting delay of the wakeup engine of the first electronic device according to the starting delay of the wakeup engine of the first electronic device and the starting delay of the wakeup engine of the at least one second electronic device comprises:

determining whether to adjust the starting delay of the wakeup engine of the first electronic device according to the starting delay of the wakeup engine of the first electronic device and the starting delay of the wakeup engine of each second electronic device in the distributed device network.

11. The non-transitory computer-readable storage medium of claim 9, wherein acquiring the starting delay of the wakeup engine of the at least one second electronic device in the distributed device network comprises:

updating, in response to determining that a device identifier of the second electronic device in the distributed device network is updated, acquired starting delay of the wakeup engine of the at least one second electronic device in the distributed device network; and wherein determining whether to adjust the starting delay of the wakeup engine of the first electronic device according to the starting delay of the wakeup engine of the first electronic device and the starting delay of the wakeup engine of the at least one second electronic device comprises:

determining whether to adjust the starting delay of the wakeup engine of the first electronic device according to the starting delay of the wakeup engine of the first electronic device and updated starting delay of the wakeup engine of the at least one second electronic device.

12. The non-transitory computer-readable storage medium of claim 9, wherein the method further comprises:

acquiring an online dotting log of at least one of the first electronic device or the at least one second electronic device;

obtaining network transmission time for transmission of a wakeup data packet after associated wakeup engine is started in the online dotting log; and determining the preset maximum delay tolerance value based on a preset decision-making timeout and the network transmission time, wherein the decision-making timeout is preset time required from reception of a wakeup event by the wakeup engine of at least one of the first electronic device or the at least one second electronic device to decision-making about whether to respond to the wakeup event.

\* \* \* \* \*